US008928454B2

(12) United States Patent
Brown et al.

(10) Patent No.: US 8,928,454 B2
(45) Date of Patent: Jan. 6, 2015

(54) COMPUTER ROOM SECURITY

(76) Inventors: Steven M. Brown, Mount Prospect, IL (US); Andrew Jimenez, Chicago, IL (US); Timothy D. Holloway, Libertyville, IL (US)

( * ) Notice: Subject to any disclaimer, the term of this patent is extended or adjusted under 35 U.S.C. 154(b) by 112 days.

(21) Appl. No.: 12/754,671

(22) Filed: Apr. 6, 2010

(65) Prior Publication Data

US 2010/0259360 A1 Oct. 14, 2010

Related U.S. Application Data

(60) Provisional application No. 61/168,092, filed on Apr. 9, 2009.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08C 19/00*** | (2006.01) |
| ***H04B 1/00*** | (2006.01) |
| ***H04B 3/00*** | (2006.01) |
| ***H04L 9/14*** | (2006.01) |
| ***H04L 9/32*** | (2006.01) |
| ***H04Q 1/00*** | (2006.01) |
| ***H04Q 9/00*** | (2006.01) |
| ***G07C 9/00*** | (2006.01) |

(52) U.S. Cl.
CPC .................................. *G07C 9/00111* (2013.01)
USPC ...... 340/5.2; 340/5.73; 340/426.28; 340/542; 340/568.1; 348/150; 235/383

(58) Field of Classification Search
USPC ................. 340/5.2, 5.73, 426.28, 542, 568.1; 348/150; 235/383
See application file for complete search history.

(56) References Cited

U.S. PATENT DOCUMENTS

| | | | | |
|---|---|---|---|---|
| 5,126,732 | A * | 6/1992 | Mardon | 340/5.33 |
| 5,223,829 | A * | 6/1993 | Watabe | 340/5.73 |
| 5,345,379 | A * | 9/1994 | Brous et al. | 700/17 |
| 5,388,032 | A * | 2/1995 | Gill et al. | 700/17 |
| 5,392,025 | A * | 2/1995 | Figh et al. | 340/547 |
| 6,010,064 | A * | 1/2000 | Umeda et al. | 235/375 |
| 6,041,851 | A * | 3/2000 | Diebel et al. | 165/104.33 |
| 6,064,316 | A * | 5/2000 | Glick et al. | 340/5.65 |
| 6,344,796 | B1 * | 2/2002 | Ogilvie et al. | 340/568.1 |
| 6,570,488 | B2 * | 5/2003 | Kucharczyk et al. | 340/5.2 |
| 6,624,739 | B1 * | 9/2003 | Stobbe | 340/5.2 |
| 6,633,090 | B2 * | 10/2003 | Harter et al. | 307/10.6 |
| 6,879,243 | B1 * | 4/2005 | Booth et al. | 340/5.73 |

(Continued)

FOREIGN PATENT DOCUMENTS

WO PCT/US09/38882 3/2009

*Primary Examiner* — Benjamin C Lee
*Assistant Examiner* — Quang D Pham
(74) *Attorney, Agent, or Firm* — Heather A. Kartsounes

(57) ABSTRACT

This invention relates to a fastener system, in particular a system for improving computer room security, that reduces energy consumption. This invention provides a fastener system comprising at least one fastener for fastening a first element to a second element, the at least one fastener having a sensor to determine status of that fastener; a trigger box having an LED panel; a junction box capable of receiving and relaying authorization access; and an IP-connected control appliance with relay input/output for access control applications. This invention is particularly useful within server racks.

4 Claims, 5 Drawing Sheets

(56) References Cited

U.S. PATENT DOCUMENTS

| | | | | |
|---|---|---|---|---|
| 6,882,269 | B2 * | 4/2005 | Moreno | 340/5.73 |
| 6,999,825 | B2 * | 2/2006 | Inomata | 700/90 |
| 7,129,817 | B2 * | 10/2006 | Yamagishi | 340/5.53 |
| 7,176,782 | B2 * | 2/2007 | Shitan | 340/5.22 |
| 7,323,967 | B2 * | 1/2008 | Booth et al. | 340/5.73 |
| 7,675,415 | B2 * | 3/2010 | Yang | 340/542 |
| 8,207,816 | B2 * | 6/2012 | Crigger et al. | 340/5.52 |
| 2002/0067261 | A1 * | 6/2002 | Kucharczyk et al. | 340/568.1 |
| 2002/0147525 | A1 * | 10/2002 | Cayne et al. | 700/214 |
| 2003/0156422 | A1 * | 8/2003 | Tatewaki et al. | 362/487 |
| 2004/0190756 | A1 * | 9/2004 | Kim et al. | 382/115 |
| 2005/0040931 | A1 * | 2/2005 | Shitan | 340/5.5 |
| 2005/0040932 | A1 * | 2/2005 | Cayne et al. | 340/5.22 |
| 2005/0237149 | A1 * | 10/2005 | Loftin et al. | 340/5.42 |
| 2006/0139149 | A1 * | 6/2006 | Faro et al. | 340/5.73 |
| 2007/0108273 | A1 * | 5/2007 | Harper et al. | 235/382 |
| 2007/0176760 | A1 * | 8/2007 | Reeves et al. | 340/426.22 |
| 2007/0250410 | A1 * | 10/2007 | Brignone et al. | 705/28 |
| 2007/0298772 | A1 * | 12/2007 | Owens et al. | 455/414.1 |
| 2008/0042811 | A1 * | 2/2008 | Le Gars | 340/432 |
| 2008/0061924 | A1 * | 3/2008 | Labowicz et al. | 340/5.5 |
| 2008/0272881 | A1 * | 11/2008 | Goel | 340/5.3 |
| 2009/0033456 | A1 * | 2/2009 | Castillo et al. | 340/5.2 |
| 2009/0040017 | A1 * | 2/2009 | Nagasawa | 340/5.2 |
| 2009/0107055 | A1 * | 4/2009 | Slagel | 52/65 |
| 2009/0128284 | A1 * | 5/2009 | Floyd | 340/5.3 |
| 2009/0141117 | A1 * | 6/2009 | Elberbaum | 348/14.04 |
| 2009/0231091 | A1 * | 9/2009 | Burwell et al. | 340/5.2 |
| 2009/0231092 | A1 * | 9/2009 | Maegawa et al. | 340/5.2 |
| 2010/0109837 | A1 * | 5/2010 | Sato et al. | 340/5.65 |
| 2011/0025502 | A1 | 2/2011 | Rudduck | |

* cited by examiner

COMPUTER ROOM SECURITY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

1. Field of the Invention

This invention relates to fasteners and in particular to their use in connection with increasing security and convenience computer room settings.

2. Description of Related Art Including Information Disclosed Under 37 CFR 1.97 and 1.98

There are many circumstances where it is desirable to provide an increased level of security and convenience. Examples are encountered on a daily basis in domestic situations, commercial environments, in transport, and so on. In particular, data centers which house racks of servers or other equipment have an increased concern about security as the information stored within the equipment is sensitive in nature. Housings, such as server racks, for computer hardware are typically locked. Server personnel need keys to gain access. Keys can be mislaid or forgotten, causing access problems when service is needed. Additionally in situations where servicing has occurred, the unlocked housing should be locked, but occasionally service personnel forget to do this, resulting in a security breach.

It is an object of the present invention, at least in some embodiments, to overcome or alleviate some of these problems and to offer benefits in increased security and/or reduced energy consumption.

BRIEF SUMMARY OF THE INVENTION

Accordingly, this invention provides a fastener system comprising at least one fastener for fastening a first element to a second element, the at least one fastener having a sensor to determine status of that fastener; a trigger box having an LED panel; a junction box capable of receiving and relaying authorization access; and an IP-connected control appliance with relay input/output for access control applications.

The fastener may be any suitable fastener, including a fastener selected from the following patent specifications, each of which is incorporated herein by reference: WO 2005/047714, WO 2004/001235, WO 2005/090798, WO 2006/105585 and WO 2007/069035. Especially preferred are the fasteners disclosed in the above specifications and referred to as beam or radial fasteners.

The fastener will preferably have a fastener body and fastener base. It is appreciated that that the fastener may be used in a variety of forms, such as a discrete fastener or a radial fastener, or any other form.

One fastener may be used, or a plurality of fasteners, preferably networked. The first element and the second element may be chosen from a very wide range. Examples are a door and a substructure therefor, a hardware rack and panel or housing to which it can be attached, a tile for a floor, wall or ceiling and a substructure to which it can be attached. There are a large number of applications.

Preferably, the fastener will comprise material adapted to contract when activated. The activation of the fastener may take place in any suitable way. There are several examples in the specifications incorporated herein by reference, and especially reference to the use of shape memory alloy. It is also within the scope of this invention that the activation is initiated by remote means, such as a hand held tool operating through the use of any suitable form of energy, including microwave, electromagnetic, sonic, infra-red, radio frequency and so on. The scope of the invention is not necessarily limited to the use of shape memory alloy. Other material may also be useful, such as shape memory polymers and ferromagnetic shape-memory materials.

The signal may be sent in any suitable way, for example, using electrical wiring, or electromagnetic means such as radio or infrared communication means. Preferably, however, hard wiring is used and also provides a means to deliver power to the fastener. For the sake of convenience, much of the description below focuses on application of the system of the invention to data centers in the computer industry. However, it is to be understood that the invention is not limited to this.

When the fastener system is to be accessed a user can use an RFID card or other suitable device for authorization and scan the RFID card on a reader joined to the IP-connected control appliance with relay input/output for access control applications. The junction box can then receive the relays and interpret the level of a user's authorization and will communicate with the trigger box of this relay signal. The trigger box comprises an LED panel. This panel has indication buttons that may light up to indicate status of the fastener system. For example when the fastener system is locked (i.e. server rack door is closed) then the LED panel reads with a red light. If the trigger box receives an authorized signal, then the LED panel may read orange. If the fastener system is unlocked (i.e. server door is open) then the LED panel may read green. One skilled in the art will recognize that the above colors are for descriptive purposes only and that any color scheme may be appropriate so long as a key deciphers the colors meaning.

Once a user is authorized and the LED panel indicates an orange (authorized) color, a user may then push the indication button which will signal the trigger box to the junction box that the button was pushed. The junction box then signals to the fastener to release and the door to the sever rack is opened. The LED panel will now read green in color (open). When a user is done accessing the server rack, he/she simply shuts the door and the first element and second element of the fastener are now joined. This action sends a signal to the trigger box and the LED panel changes color once again to indicate that the fastener is locked.

This fastener system is able to log both opening and closing events and provide such a log to a user by way of the IP-connected control appliance.

The junction box will typically mount to the rear of a rack and will accommodate PCB boards, sometimes more then one identical PCB boards, and also a power supply. The junction box processes signals from authorization cards and sends signals/commands to the fastener or plurality of networked fasteners.

The trigger box can trigger at least one fastener or a plurality of networked fasteners.

Communication may occur between the trigger box, junction box, and fastener wirelessly or through hard wiring or any other acceptable communication means.

BRIEF DESCRIPTION OF THE SEVERAL VIEWS OF THE DRAWINGS

Preferred features of the present invention will now be described with particular reference to the accompanying drawings. However, it is to be understood that the features illustrated in and described with reference to the drawings are not to be construed as limiting on the broad scope of the invention.

In the drawings.

DETAILED DESCRIPTION OF THE INVENTION

Figure 1:
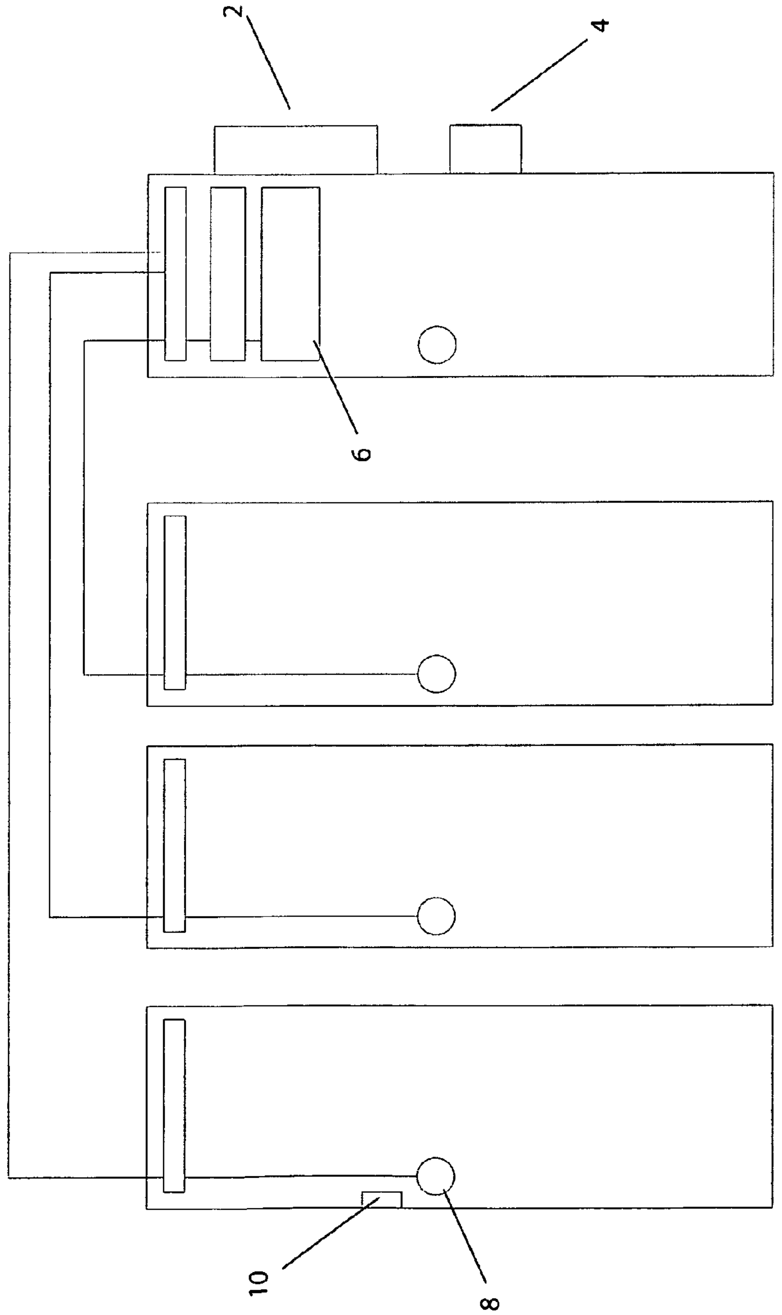
FIG. 1 is a view of the fastener system architecture.
Figure 2:
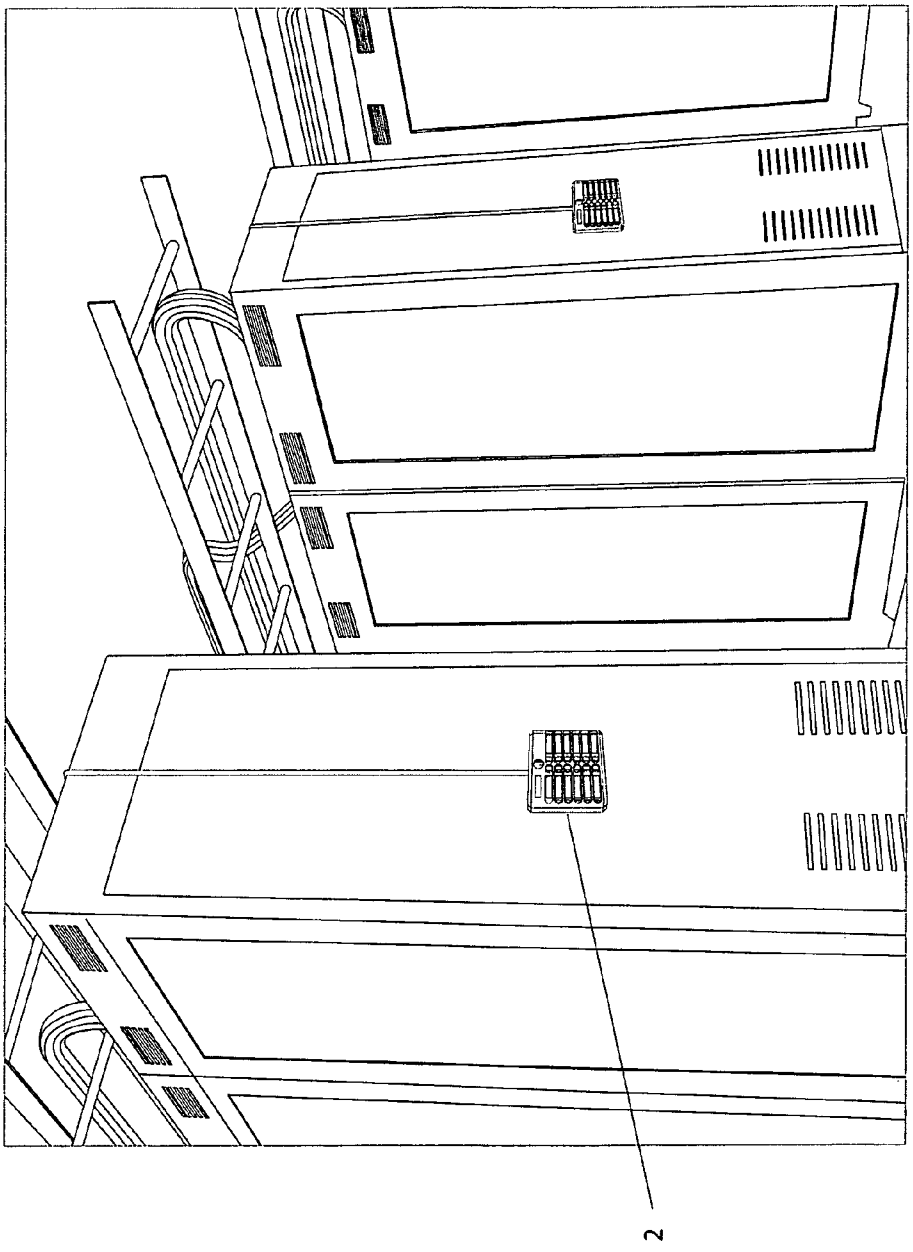
FIG. 2 is a view of the server rack with the trigger box.
Figure 3:
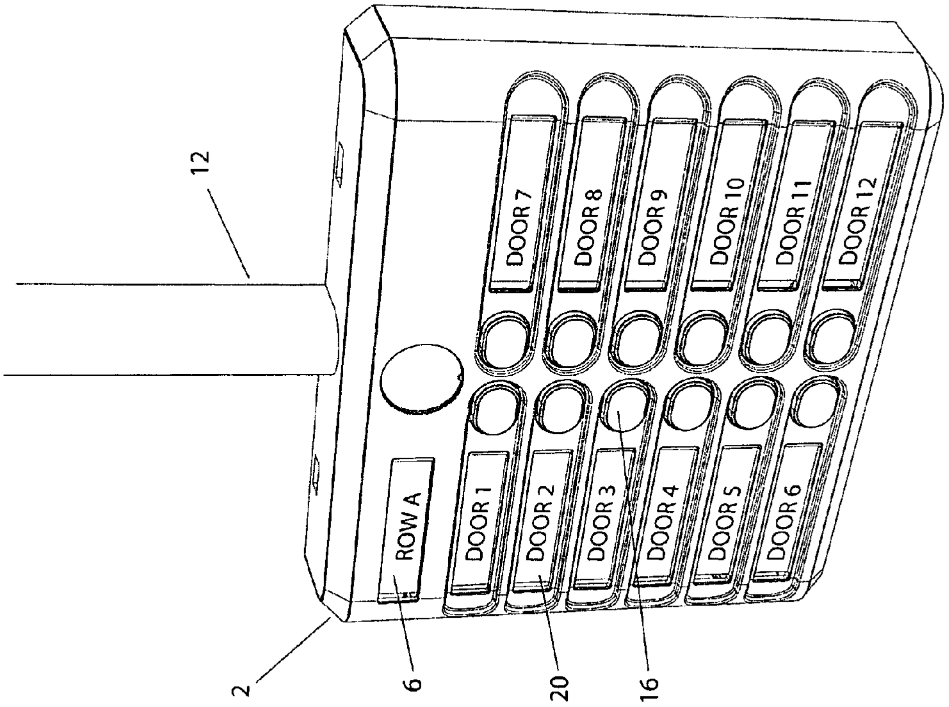
FIG. 3 is a detailed view of the trigger box.
Figure 4:
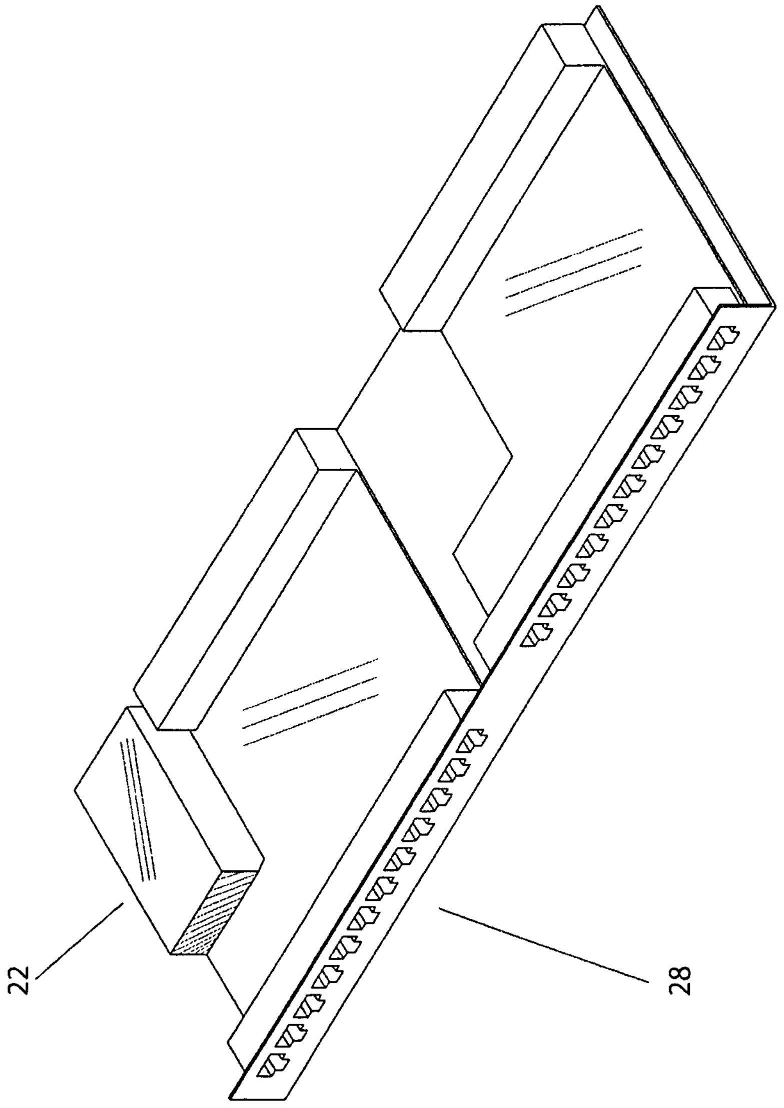
FIG. 4 is a detailed view of the junction box.

This invention relates to at least one fastener 8 for fastening a first element 14*a* to a second element 14*b*, said fastener 8 having a sensor 10 to determine status of fastener 8; a trigger box 2 having an LED panel 20; a junction box 22 capable of receiving and relaying authorization access; and an IP-connected control appliance 6 with relay input/output for access control applications.

Figure 5:
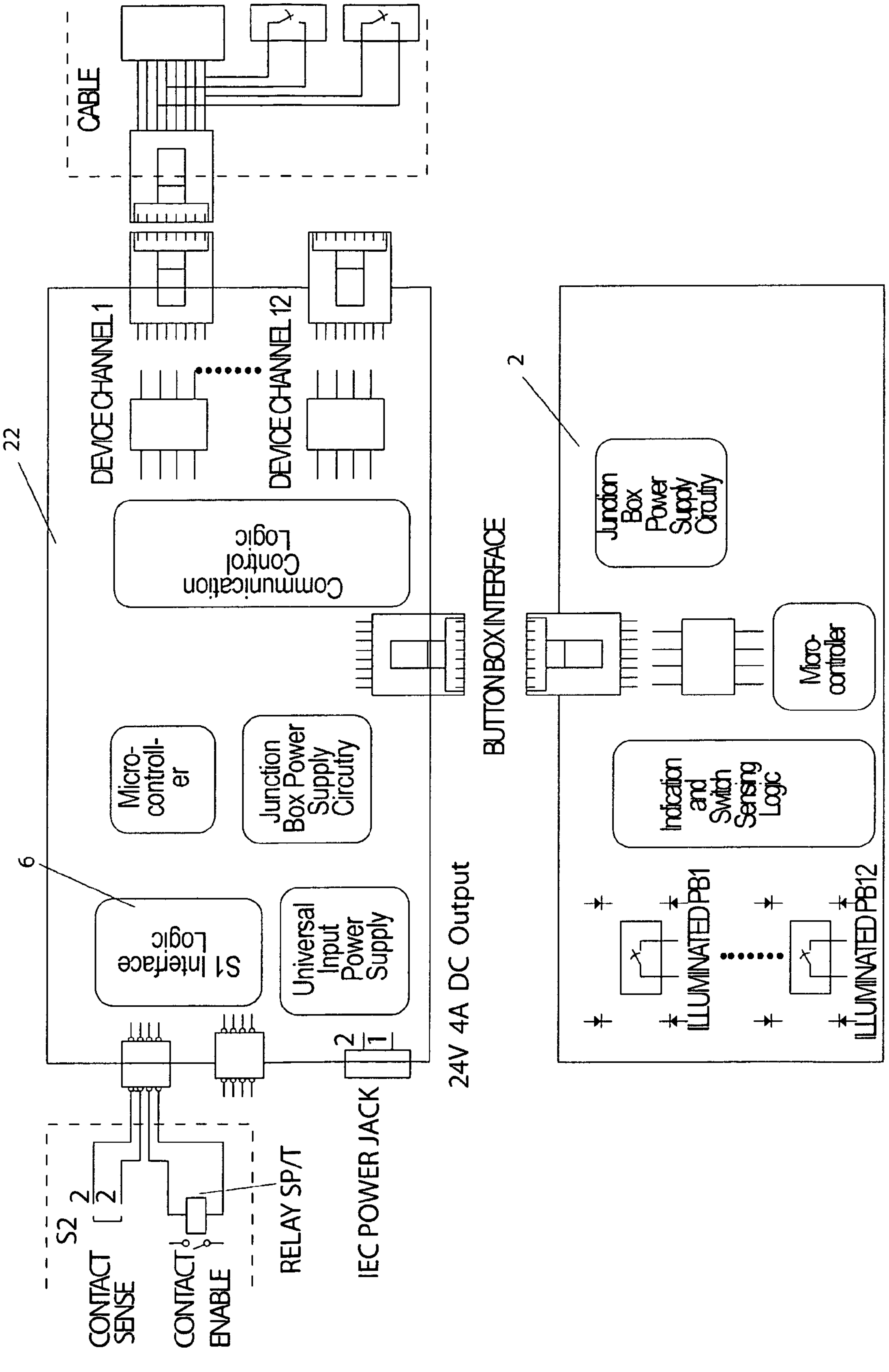
FIG. 5 is a schematic view of the fastener system.

The trigger box 2 is attached to a server rack 14 in a accessible location such as the side of the rack 14. The junction box 22 is located in the rear of the rack 14. FIG. 5 depicts the schematic view of the junction box 22 and trigger box 2. When a user scans for authorization on the RFID reader 4, the IP-connected control appliance 6 will send a relay to the junction box 22 which will in turn receive the signal and notify the trigger box 2 and the LED panel 20 with indication buttons 16 will be illuminated to an authorization color. According to the signal received the trigger box 2 may allow a user to effectively press an indication button 16 to release a fastener within the rack 14. Upon that action, the first element 14*a* will be released from the second element 14*b* and a user can access the contents of the rack 14.

When servicing of the contents is complete, the fastener 8 will lock once the first element 14*a* is joined with the second element 14*b*. This action will send a signal to the junction box 22 by reading the status of the sensor 10 and sends a signal to the trigger box 2 to illuminate the indication buttons to a color that relays authorization status received from the IP-connected control appliance 6. The IP-connected control appliance 6 receives communication that the rack 14 is now closed.

It will be appreciated that the embodiments disclosed herein are not limiting on the scope of the invention and that variations and modifications may be made without departing from the spirit and scope of the invention.

What is claimed is:

1. A fastener system comprising:

a fastener for fastening a first element to a second element, the fastener having a sensor to determine locked and unlocked status of the fastener;

a junction box;

a trigger box having an LED panel adapted to indicate the locked or unlocked status of the fastener; said trigger box includes a button capable of unlocking the fastener after an authorized user access signal from the junction box is received and the button is depressed;

and an IP-connected control appliance with relay input/output for access control applications; the control appliance is capable of logging unlocking and locking of the fastener, wherein the junction box is capable of receiving an authorized user access relay from the control appliance and:

(i) sending the authorized user access signal to the trigger box; and (ii) communicating with the fastener;

wherein the trigger box is capable of receiving the authorized user access signal from the junction box;

wherein the LED panel is adapted to indicate receipt of the authorized user access signal from the junction box and is adapted to display a first color to indicate the locked status of the fastener, a second color to indicate the unlocked status of the fastener and a third color to indicate the receipt of the authorized user access signal; and wherein the fastener includes material adapted to contract when activated.

2. The fastener system of claim 1 wherein the control appliance is connected to an RFID card reader.

3. A fastener system comprising:

a plurality of fasteners, each for fastening a first element to a second element, each fastener having a sensor to determine locked and unlocked status of the fastener;

a junction box;

a trigger box having an LED panel adapted to indicate the locked or unlocked status of each fastener; the trigger box includes a button for each fastener, the button being capable of unlocking the fastener after an authorized user access signal from the junction box is received and the button is depressed; and an IP-connected control appliance with relay input/output for access control applications; said control appliance is capable of logging unlocking and locking of each fastener wherein the junction box is capable of receiving an authorized user access relay from the control appliance and:

(i) sending the authorized user access signal to the trigger box; and (ii) communicating with each fastener;

wherein the trigger box is capable of receiving the authorized user access signal from the junction box;

wherein the LED panel is adapted to indicate receipt of the authorized user access signal from the junction box and is adapted to display a first color to indicate the locked status of each fastener, a second color to indicate the unlocked status of each fastener and a third color to indicate the receipt of the authorized user access signal;

and wherein each fastener includes material adapted to contract when activated.

4. The fastener system of claim 3 wherein the control appliance is connected to an RFID card reader.

* * * * *